United States Patent
Yu

(10) Patent No.: US 11,836,249 B2
(45) Date of Patent: Dec. 5, 2023

(54) SYSTEM AND METHOD FOR COUNTERACTING ADVERSARIAL ATTACKS

(71) Applicant: PAYPAL, INC., San Jose, CA (US)

(72) Inventor: Xiaodong Yu, Singapore (SG)

(73) Assignee: PAYPAL, INC., San Jose, CA (US)

( * ) Notice: Subject to any disclaimer, the term of this patent is extended or adjusted under 35 U.S.C. 154(b) by 622 days.

(21) Appl. No.: 16/691,307

(22) Filed: Nov. 21, 2019

(65) Prior Publication Data
US 2021/0157911 A1   May 27, 2021

(51) Int. Cl.
*G06F 21/00* (2013.01)
*G06F 21/55* (2013.01)
*G06T 1/00* (2006.01)
*G06N 20/00* (2019.01)
*G06N 3/045* (2023.01)

(52) U.S. Cl.
CPC .......... *G06F 21/554* (2013.01); *G06N 3/045* (2023.01); *G06N 20/00* (2019.01); *G06T 1/005* (2013.01)

(58) Field of Classification Search
CPC ....... G06F 21/554; G06F 21/64; G06N 20/00; G06N 3/0454; G06T 1/005; H04L 63/1441
See application file for complete search history.

(56) References Cited

U.S. PATENT DOCUMENTS

| | | | | |
|---|---|---|---|---|
| 10,984,272 | B1* | 4/2021 | Shrivastava | G06T 5/002 |
| 2015/0296152 | A1* | 10/2015 | Fanello | G06V 10/30 |
| | | | | 348/241 |
| 2019/0122076 | A1* | 4/2019 | Sen | G06V 10/82 |
| 2019/0188562 | A1* | 6/2019 | Edwards | G06N 3/04 |
| 2019/0325163 | A1* | 10/2019 | Sharad | G06F 21/82 |
| 2020/0104711 | A1* | 4/2020 | Aytekin | G06N 3/045 |
| 2021/0019541 | A1* | 1/2021 | Wang | G06V 10/82 |
| 2021/0152549 | A1* | 5/2021 | Wu | H04W 12/06 |
| 2021/0192357 | A1* | 6/2021 | Sinha | G06N 3/088 |

OTHER PUBLICATIONS

Title: Extreme Learning Machine Ensemble Using Bagging for Facial Expression Recognition Authors: Deepak Ghimire and Joonwhoan Lee Date: 2014 Publisher: J Inf Process Syst.*
Title: Unravelling Robustness of Deep Learning Based Face Recognition against Adversarial Attacks Authors: Gaurav Goswami, Nalini Ratha,Akshay Agarwal,Richa Singh,Mayank Vatsa Date: 2018 Publisher: Association for the Advancement of Artificial Intelligence.*

(Continued)

*Primary Examiner* — Abu S Sholeman
*Assistant Examiner* — Gita Faramarzi
(74) *Attorney, Agent, or Firm* — Haynes and Boone, LLP

(57) ABSTRACT

Aspects of the present disclosure involve systems, methods, devices, and the like for generating an adversarially resistant model. In one embodiment, a novel architecture is presented that enables the identification of an image that has been adversarially attacked. The system and method used in the identification introduce the use of a denoising module used to reconstruct the original image from the modified image received. Then, further to the reconstruction, an adversarially trained model is used to make a prediction using at least a determination of a loss that may exist between the original image and the denoised image.

20 Claims, 7 Drawing Sheets

(56) References Cited

OTHER PUBLICATIONS

Xiaodong Y., "Build robust deep learning model resistant to adversarial attacks," May 27, 2019, 3 pages.

Zheng, Zhihao and HONG, Pengyu; "Robust Detection of Adversarial Attacks by Modeling the Intrinsic Properties of Deep Neural Networks", 32nd Conference on Neural Information Processing Systems (NeurIPS 2018), Montreal, Canada; pp. 1-10.

Metzen, Jan Hendrik et al.; "On Detecting Adversarial Perturbations", Published as a conference paper at ICLR 2017, arXiv:1702.04267v2 [stat.ML] Feb. 21, 2017.

Goodfellow, Ian J, Shlens Jonathon, and Szegedy, Christian. Explaining and harnessing adversarial examples. arXiv preprint arXiv:1412.6572, 2014.

Kurakin, Alexey, Goodfellow, Ian, and Bengio, Samy. Adversarial machine learning at scale. arXiv preprint arXiv:1611.01236, 2016.

* cited by examiner

SYSTEM AND METHOD FOR COUNTERACTING ADVERSARIAL ATTACKS

TECHNICAL FIELD

The present disclosure generally relates to data analytics, and more specifically, to a system design of a deep learning model resistant to adversarial attacks.

BACKGROUND

Nowadays with the proliferation of electronics, users are constantly relying on their electronics for access to social media, transacting, authenticating, messaging, etc. However, with such reliance comes the need for complex computations and big data analytics. As such, industry and academia have largely focused on the use of machine learning models for such computational analytics where statistical models can perform tasks without implicit instructions. In particular, deep neural networks have been getting more attention for their use in computer vision, natural language processing, and speech recognition. An issue recently encountered is the susceptibility of deep neural networks to adversarial attacks. An adversarial attack can include the modification of input data to make the data behave in a manner that is not intended. Thus, a well-trained classifier may be deceived and provide results with wrong predictions. Therefore, it would be beneficial to have a system and method designing deep learning models resistant to adversarial attacks.

Figure 1A:
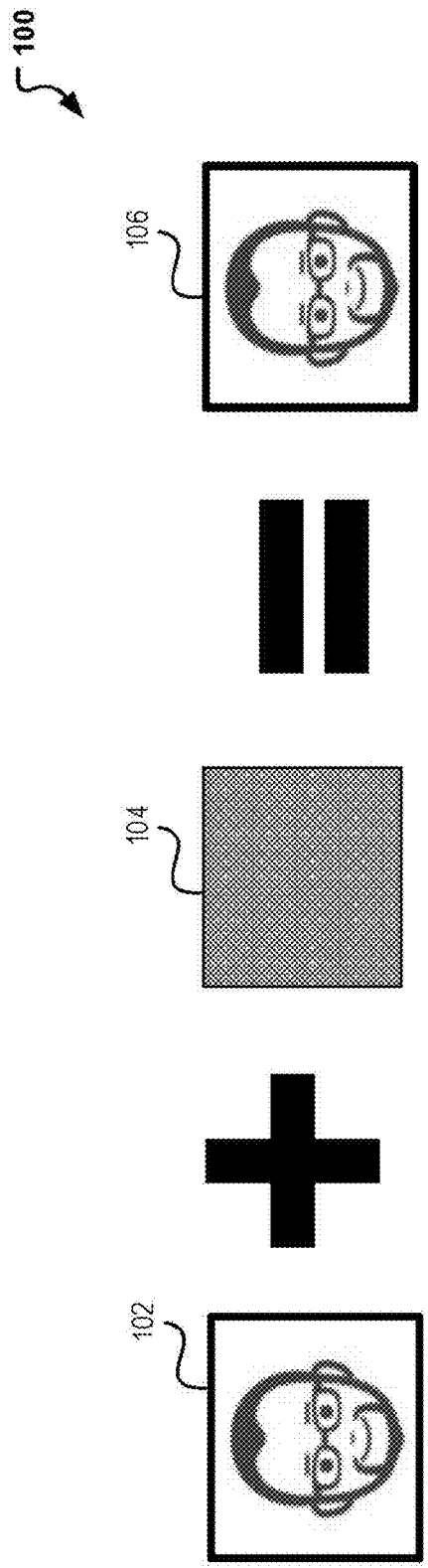
FIGS. 1A-1B illustrates exemplary applications of an adversarial attack and prediction model.

Embodiments of the present disclosure and their advantages are best understood by referring to the detailed description that follows. It should be appreciated that like reference numerals are used to identify like elements illustrated in one or more of the figures, whereas showings therein are for purposes of illustrating embodiments of the present disclosure and not for purposes of limiting the same.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Aspects of the present disclosure involve systems, methods, devices, and the like for generating an adversarially resistant model. In one embodiment, a novel architecture is presented that enables the identification of an image that has been adversarially attacked. The system and method used in the identification introduce the use of a denoising module used to reconstruct the original image from the modified image received. Then, further to the reconstruction, an adversarially trained model is used to make a prediction using at least a determination of a loss that may exist between the original image and the denoised image.

Nowadays with the proliferation of electronics, users are constantly relying on their electronics for access to social media, transacting, authenticating, messaging, etc. However, with such reliance comes the need for complex computations and big data analytics. As such, industry and academia have largely focused on the use of machine learning models for such computational analytics, where statistical models can perform tasks without implicit instructions. In particular, deep neural networks have been getting attention for their use in computer vision, natural language processing, and speech recognition. An issue recently encountered is the susceptibility of deep neural networks to adversarial attacks. An adversarial attack can include the modification of input data to make the data behave in a manner that is not intended. Consequently, a well-trained classifier may be deceived and provide results with wrong predictions.

Figure 1B:
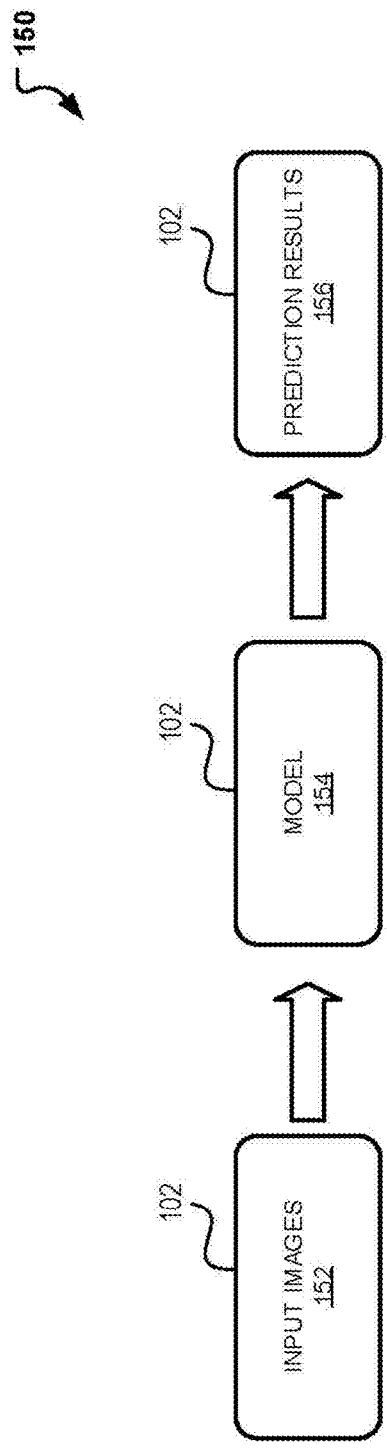

To illustrate how adversarial attacks function, consider FIGS. 1A-1B which illustrate exemplary applications of an adversarial attack and a corresponding prediction model. Turning first to FIG. 1A, an exemplary adversarial attack is illustrated. In an adversarial attack, the original image may be carefully modified such that the modification is unperceivable and may be used to trick a system. In some instances, adversarial attacks, may be done with good intent and used to thwart a computer from authentication. For example, a small perturbation may be added to the original image to counter false authentication via a completely automated public turing test to tell computers and humans apart (CAPCHAT). The small perturbation 104 although not visible to the human eye may lead a computer to select an incorrect output and avoid invalid authentication.

However, in other instances the adversarial attacks may be purposeful and with evil intent. For example, a perturbed sticker may be placed on a traffic stop sign which may continue to "look" like a stop, however as read by a machine (or in this case an autonomous vehicle), may be interpreted to be a yield sign or other hazardous output. As such, it is important to identify a solution that can provide an adversarial attack resistant output. To illustrate the concept of an adversarial attack, consider again FIG. 1A. As indicated, an adversarial attack includes the modification of an original image 102. The original image 102 may be a foto, picture, jpeg, gif, png, sticker, quick response (QR) code, bar code, pdf, bmp, tiff, bitmap, and the like. In one exemplary example, the original image 102 may be a captured image of a user. The original image 102 may be obtained from a camera or other sensor of a user device. Alternatively, the original image 02 may be created on a device, scraped from the internet, copied from a document, obtained from a repository or database, etc. The original image 102 may be a selected image used for authentication, for information, or for any other use wherein the original image 102 is the desired image used for performing or generating a desired output. To modify the desired output, the original image may be modified by a system. The modification may be at a pixel level, may include noise, and/or may include a perturbation 104 often undetectable by the human eye. Thus, an original image 102 may be modified by a perturbation 104 such that a modified image 106 is generated. The modified image 106 may include a modification to minimal to perceive. However, although unperceivable by the human eye, the perturbation 104 added to the original image 102 is sufficient to trick or cause a system to produce an undesired output. Therefore, at FIG. 1A, where the human would observe the user, the system or neural network would detect that the modified image 106 is another user, animal, or other object with higher confidence. As such, the system may be tricked and cause an erroneous action to occur.

To counter adversarial attacks such as the one from FIG. 1A, a trained model may be used. For example, turning next to FIG. 1B, a sample flow 150 for detecting an adversarial attack is presented. In this sample flow 150, a detection may be made by using conventional neural network methodology where the trained model is used to predict an output. At flow 150, the input image 152 may be received at a system and a trained model 154 may be used to predict or obtain a prediction on what the original image 102 was, to obtain a desired result, to perform action to perform in response to the observed original image or to obtain any other prediction or prediction results 156.

In some instances, the trained model 154 may be an adversarial trained model designed to predict the original image despite the addition of a perturbation. The adversarial trained model may be trained using a variety of methods. For example, the adversarial trained model may be trained and augmented through the introduction of adversarial examples. As another example, the trained model may be trained using a two-class classifier using classifier states to detect adversarial inputs. Still in another example, the trained model may be trained using intrinsic properties of a classifier to detect the adversarial input. However, the results from such models may be inferior, as unforeseen inputs not anticipated during the training process may result in the wrong prediction. Therefore, it would be beneficial to identify a system and method capable of creating an adversarial resistant model.

Figure 2:
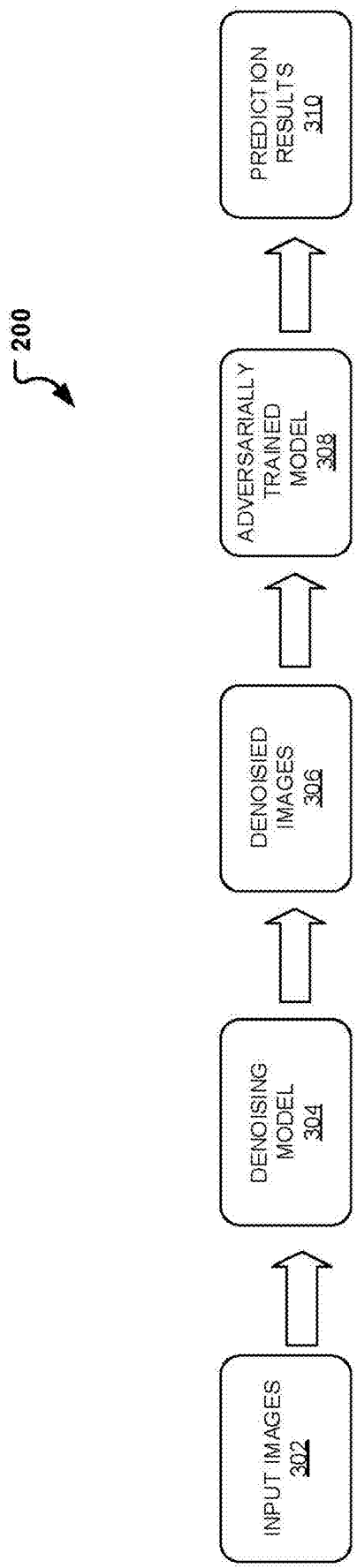
FIG. 2 illustrates exemplary block diagram of flow of a method for designing a deep learning model resistant to adversarial attacks.

Turning next to FIG. 2, a block diagram of flow of a method for designing a deep learning model resistant to adversarial attacks is illustrated. In particular, FIG. 2 illustrates an augmented method for detecting an adversarial attack. Again, input images 302 may be transmitted to or received at a system for detection. The input images 302 may include one or more original images 102 that are presented to the system for making a prediction(s). In one embodiment, an original image 102 from a plurality of input images 302 may be transmitted to a system with an adversarial attack resistant model. The adversarial attack resistant model may include at least a denoising model 304. The denoising model 304 is introduced to aid in overcoming the deficiencies of other conventional methods. For example, the denoising model 304 may be considered a pre-filtering module use to denoise inputs prior to receipt by the adversarially trained model 308. In particular, the denoising model 304 is used to reconstruct the modified image such that it is as similar as possible to the original image 102. To perform the reconstruction, in one embodiment, a denoising encoder (DEA) may be used. The denoising encoder may reconstruct the original image 102 by 1) first trying to encode the inputs or preserve the information about the original image 102 and then 2) undo the corruption or perturbation added. For this reconstruction, a stochastic process may be applied wherein statistical dependencies may be captured and losses measured. For example, if x is used to denote the original image 102, the corrupted image (modified image 106) as x* and a denoised image as $\hat{x}$, then the denoising function may be denoted as D: x*→$\hat{x}$, where a loss function is defined by $$L=\|x-\hat{x}\|$$

where $\|\cdot\|$ stands for the L1 norm. Therefore, the denoising model may be used to aid in recognizing a corrupt or modified image 106, such that next time the system encounters an image which has been perturbed, it is recognized it. In other words, the denoising model operate as a defense against adversarial attacks by recognizing/learning when an image is corrupt. Further details on how the autoencoder and in particular the denoising model 304 functions are provided below and in conjunction with FIG. 4.

Thus, as the input images 302 are added to a system, the input signals are first filtered by a denoising model 304, resulting in denoised images $\hat{x}$ 304, which are then input into an adversarially trained model 308. To train the adversarially trained model 308, adversarial images may be used. That is to say, randomly generated noise may be added to the original images and/or adversarially attacked images may be used to train the model so that next time a similar image is detected, the model can differential from the original image. In one embodiment, to acquire the adversarially trained model, model optimization is performed. For example, an exemplary optimization can include the use of a classification problem with an underlying data distribution D over training pairs $x \in \mathbb{R}^d$ and $y \in [k]$. Where given a suitable loss function $L(\theta, x, y)$ with parameters $\theta \in \mathbb{R}^d$, the goal is to find $\theta$ that minimizes an empirical risk $\mathbb{E}_{(x,y) \sim D}[L(\theta, x, y)]$ while maximizing the loss of some of the adversarial inputs. The adversarial inputs are created by introducing some adversarial inputs. The adversarial inputs are created by introducing some perturbations $S \in \mathbb{R}^d$ to the original input x. Thus, the optimization problem may be defined as $$\min_\theta \rho(\theta),$$

where $$\rho(\theta) = \mathbb{E}_{(x,y) \sim D}\left[\max_{\delta \in S} L(\theta, x + \delta, y)\right]$$

and the optimization problem becomes the composition of an inner maximization problem and outer minimization problem. The inner maximization problem aims to find the adversarial version of original input x, with perturbation that has a high loss. The high loss mimicking the adversarial attack on a neural network. The outer minimization used to find the parameters the minimize the total loss given by the adversarial inputs. Thus, the combined min-max optimization providing a robust classifier using adversarial training techniques.

In one embodiment, to solve the optimization problem a Fast Gradient Sign Method (FGSM) may be used. The FGSM generally works by using gradients in a deep learning network to recreate the original image to create a new image that maximizes the loss. In one embodiment, a multi-step variant of the $FSGM^k$, which is superior to the one-step approach may be used. This multi-step variant of the $FSGM^k$, which is a projected gradient descent (PGD) on the negative loss function may be used and expressed as $$x^{t+1} = \text{Proj}_{x+s}(x^t + \alpha \ \text{sgn}(\nabla_x L(\theta, x^t, y))).$$

Therefore, in one embodiment, the multi-step $FSGM^k$ may be used as the maximizing scheme for the inner optimization problem while the outer minimization may be solved using the stochastic gradient descent. Then, once the system converges, and the adversarially trained model 308 is optimized, the adversarially trained model 308 may be used for making predictions. Thus, as a denoised image 306 is received, it may be processed by the adversarially trained model 308 to obtain the prediction results 310.

Figure 3:
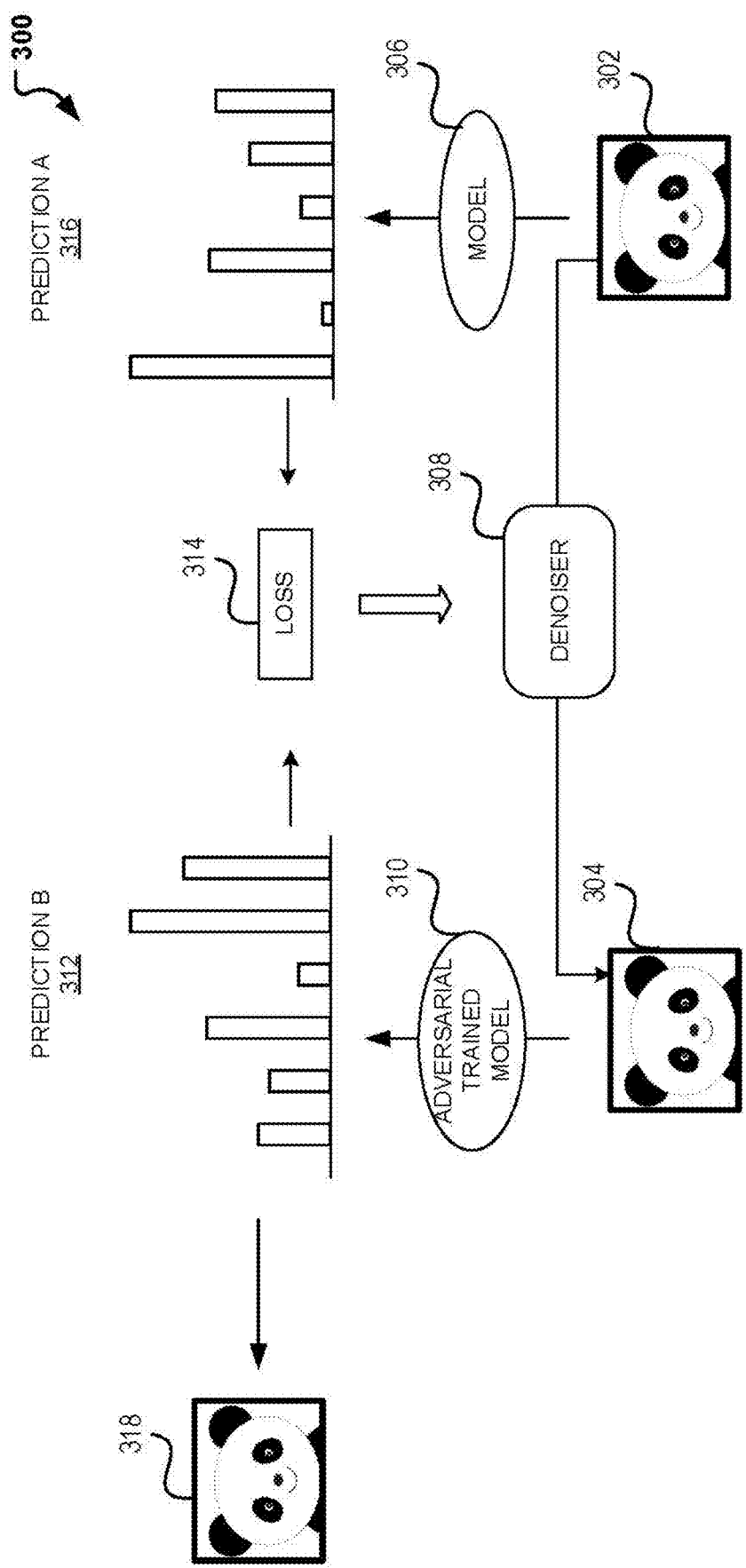
FIG. 3 illustrates block diagram of an exemplary adversarial attack resistant model.

Next, to illustrate how the process is implemented, FIG. 3 is presented. In particular, FIG. 3 illustrates block diagram of an exemplary adversarial attack resistant model. As illustrated, an image may be input into a deep learning model 306 which will provide a prediction A 316. However, as previously indicated the prediction A 316 may be incorrect in instances where the image has been adversarially attacked. That is to say if the image is a modified image 302, then processing by the model 306 may yield the wrong prediction A 316. For example, consider the modified image 302 being a "panda." After processing this modified "panda" image by the model, 306, the prediction A 316 may result in a "dog" prediction. This erroneous prediction may occur when the model is not an adversarially trained model and/or where in the images or input used to train the model did not include the perturbation introduced in the currently processed modified image 302.

In one embodiment, to overcome the incorrect prediction, the modified image 302 may instead be processed by a denoiser 308, which as previously introduced in FIG. 2 may be considered a pre-filtering module use to convert the modified image 302 back to the original image 318. As such, the denoiser 308 generates the denoised image 304 which includes the modified image after having been filtered and where its loss 314 against the original image 318 is considered. Therefore, the adversarially trained model 310 may be trained from the loss 314 of the denoised image 304, where the loss 314 against the original image 318 and the denoised image 304 is minimized and accordingly a zero loss indicates the original image 318.

As such, the modified image 302 is input to a denoiser 308, wherein the denoiser attempts to reconstruct the original image 318 by filtering out the noise (or perturbation) introduced in the adversarial attack. Output from the denoiser is a denoised image 304 which in corresponds to the reconstructed image. The reconstructed or denoised image 304 is then input into the adversarially trained model which as previously indicated may have been previously trained using other adversarially attacked images. The adversarially trained model 310 is therefore trained to recognize similar perturbations to those used during training. Having been trained, the adversarially trained model 310 can then take the "cleaner" modified (now denoised image 304) and provide a prediction B 312. For example, in consideration of the panda example previously introduced, where the false "dog" prediction A 316 was previously identified, the now denoised and processed image can be properly classified via prediction B 312 as an original "panda" image.

Notice that further to the use of the denoiser, the loss 314 identified between the original image 318 and the denoised image 304 during the adversarial trained model 310 may be used and feedback to the denoiser to provide improved classification. Thus, in one embodiment, the prediction process may be an iterative process wherein a feedback loop exists between the denoiser and the output of the adversarially trained model in order to mitigate loss. That is to say, the modified image 302 and/or the denoised image 304 may be further iteratively processed by the adversarially trained model in order to achieve minimal or no loss encountered between the denoised image 304 and the original image 318, resulting in a correct prediction B 312. In another embodiment, the modified image 302 may be processed by an adequate model 306 (e.g., if facial recognition is requested, then a corresponding facial recognition model is used or other deep learning model) including the adversarially trained model 310 and loss 314 may also be recorded and provided to the denoiser 308 for use in classification. Still in another embodiment, the denoiser 308 output or denoised image 304 may be processed by a plurality of adversarially trained models in order to obtain an ensemble prediction. Yet still in another embodiment, the denoised image may be serially processed by distinct adversarial trained models, wherein distinct predictions are provided, and a top prediction is selected.

Figure 4:
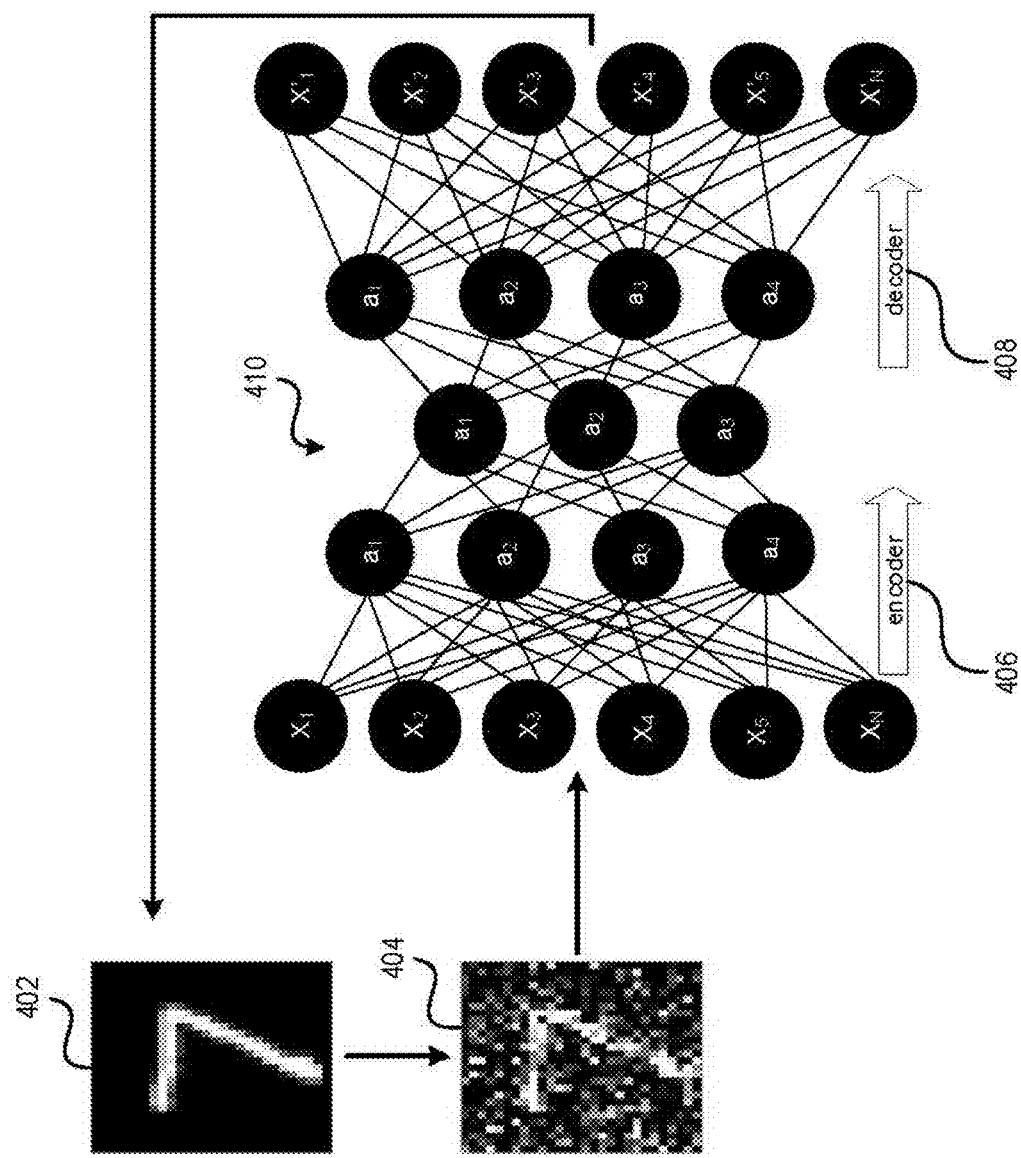
FIG. 4 illustrates a block diagram illustrating an exemplary architecture for use in designing an adversarial attack resistant learning model.

Because the denoiser 308 provides filtering used to improve prediction results, FIG. 4 is introduced to illustrate the processing involved within the denoiser. As indicated, the denoiser 308 is used to reconstruct the modified image 304 such that it is as similar as possible to the original image 318. To perform the reconstruction, an autoencoder may be used. In one embodiment, a denoising autoencoder 400 may be used as illustrated in FIG. 4. The denoising encoder may operate as a network where may reconstruct the original image 318 (original image 402 by 1) first trying to encode the inputs or preserve the information about the original image 318 and then 2) undo the corruption or perturbation added.

To illustrate how the denoising autoencoder 400 operates, consider the network illustrated with an encoder 406 and a decoder 408 used for feature selection and extraction. To perform feature selection and extraction the denoising autoencoder 400 uses dimensionality reduction. For the dimensionality reduction, the encoder 406 functions by learning features of the input. To learn, the number of neurons decrease as the network approaches the middle layer. Therefore, the encoder functions by going down to a hidden layer, which is the higher-level representation of the features. Because the denoising autoencoder 400 is a feedforward neural network, the input is the same as the output. Thus, the decoder 408 tries to reverse the process in a symmetrical manner. Therefore, where the encoder 406 goes down to a hidden layer, the decoder 408 goes back to the expanded layer. That is to say, where the encoder 406 compresses the input image to produce a code 410, the decoder 408 reconstructs the input image using the code 410.

Accordingly, the denoising autoencoder 400 functions by taking an image 402 and introducing noise to the image to generate a perturbed image 404 (modified image 302). The perturbed image 404 is then fit into the denoised network or the denoising autoencoder 400. The denoising autoencoder 400 then uses the encoder to determine and extract the features of the perturbed image 404 to use while reducing dimensionality at each layer until a code 410 is produced. Then, the image is reconstructed by the decoder using the code 410 to reproduce the original image 402. As illustrated in FIG. 4, the perturbed image 404 is represented by nodes $x_1$-$x_N$ and reconstructed image $x'_1$-$x'_N$, where the goal of the system is to minimize reconstruction loss such that $x_1$-$x_N$ and reconstructed image $x'_1$-$x'_N$ are equivalent. Thus, reconstruction loss is determined and measured against the original image 402. To determine the noise, projected gradient descent may be used where a gradient step may be taken in the direction of the greatest loss and then repeated as necessary until convergence is achieved. In some embodiments, loss may be measured against a threshold, and/or iterations may continue until the perturbed image 404 is equivalent to the original image. Once known, the loss may then be used for aiding in updating the denoiser 308 as discussed above and illustrated in FIG. 3.

Note that in one embodiment, during a request for evaluating if an image suffered an adversarial attack, the original image may be unknown. Also note that although gradient descent is described here, other techniques may be used and the process here is not so limited, for example evolutionary algorithms (EA), particle swarm optimization (PSO), and the like may be used. In addition, note that the number of layers used in the denoiser may vary as can the features and code determined and used for one or more of the evaluations for an adversarial attack.

Figure 5:
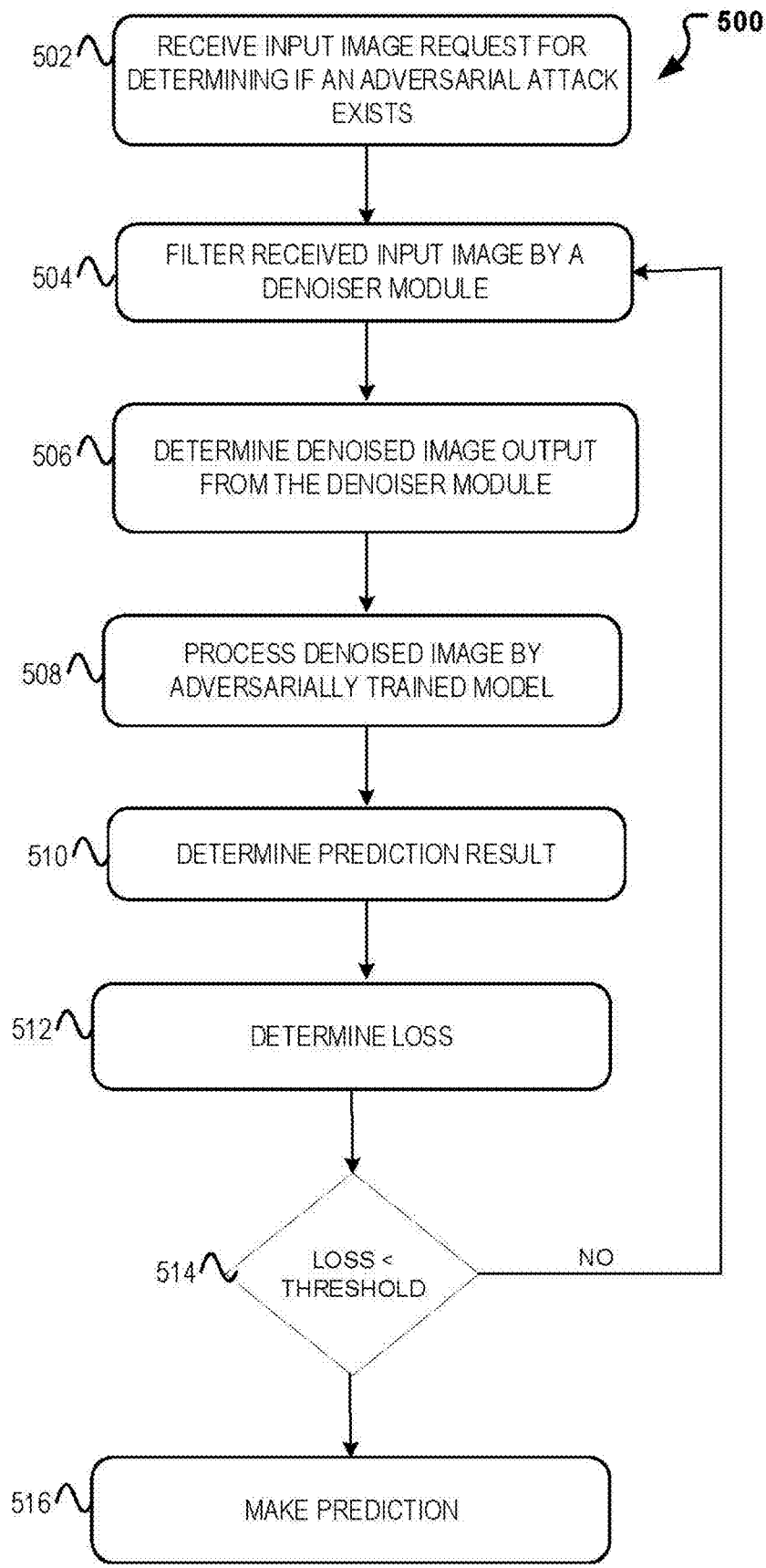
FIG. 5 illustrates a flow diagram illustrating operations for designing a deep learning model resistant to adversarial attacks.
Figure 6:
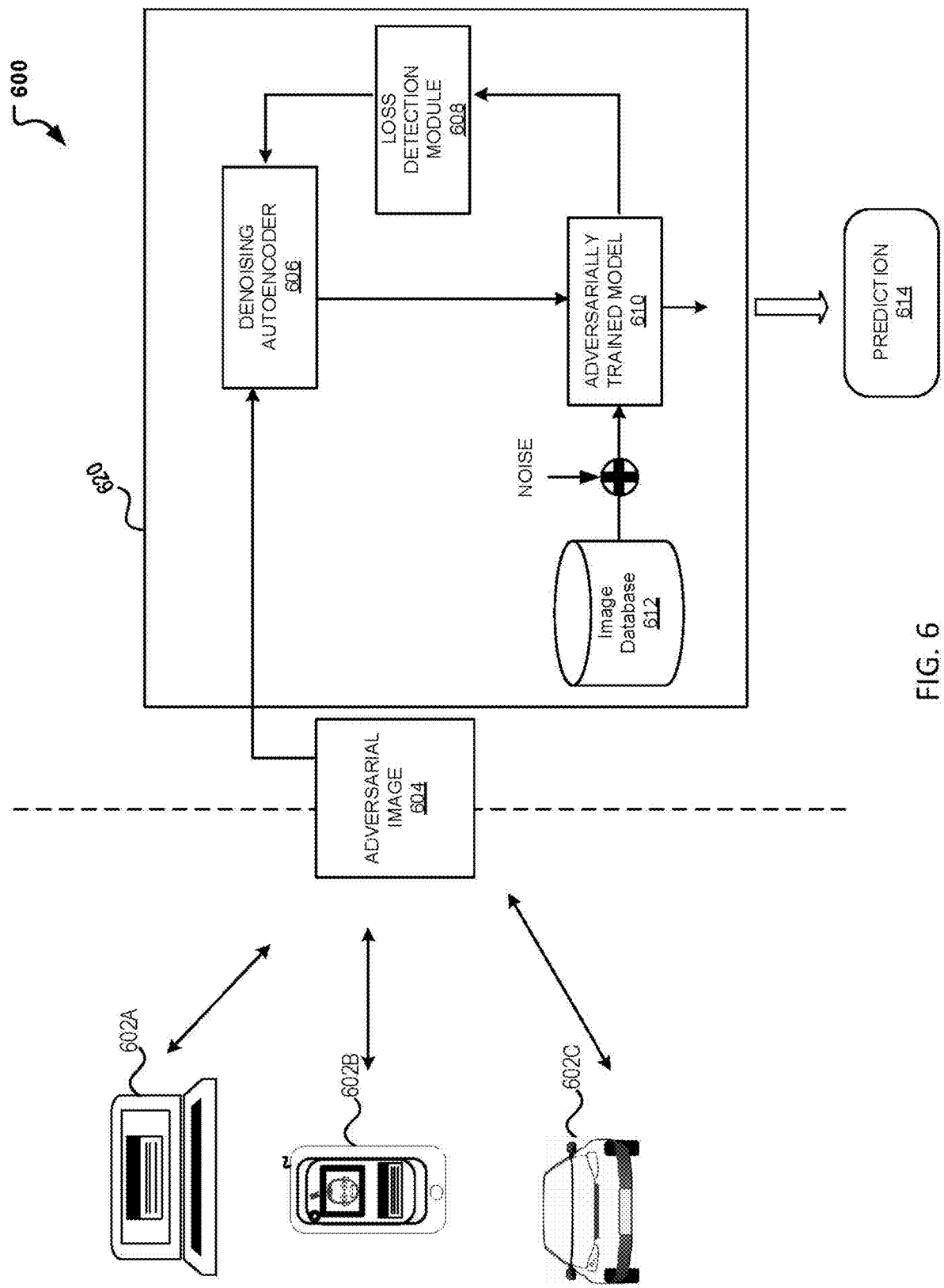
FIG. 6 illustrates an exemplary architecture for building an adversarial attack resistant model.

To illustrate how the auto-determining feature system may be used, FIG. 5 is introduced which illustrates an example process 500 that may be implemented on a system 600 of FIG. 6. In particular, FIG. 5 illustrates a flow diagram illustrating how to build an adversarial attack resistant model. According to some embodiments, process 500 may include one or more of operations 502-516, which may be implemented, at least in part, in the form of executable code stored on a non-transitory, tangible, machine readable media that, when run on one or more hardware processors, may cause a system to perform one or more of the operations 502-516.

Process 500 may begin with operation 502, where a request for performing a check for an adversarial attack is received. The request may begin with an image which may be corrupted by noise or perturbation, and/or has been otherwise been modified. The request may be received at a system designed for detecting such images which includes the use of adversarial resistant model. The system which is described below and in conjunction with FIG. 6 may include such model and at least a denoising autoencoder module for detecting an adversarially attacked image.

At operation 504, the image is input into the denoising autoencoder module where the image is filtered out. As previously indicated, the denoising autoencoder is designed to reduce losses between a modified image and the original image. To do so, the autoencoder performs feature extraction and dimensionality reduction via the use of an encoder. Then, a decoder reconstructs the image using code identified at the lowest (hidden) layer within the network of the denoising autoencoder.

Once noise has been removed from the received image, a denoised image is now generated at operation 506. The denoised image is a resulting image obtained when the received imaged has been reconstructed and losses between the images minimized. This denoised image may then more adequately processed by an adversarially trained model at operation 508. The adversarially trained model, may be a model which has been trained using a plurality images which have been adversarially attacked. The premise being that when analyzing a received image, the noise or perturbation identified in the received image will be similar to at least one of those seen during training.

Once the adversarially trained model has processed the denoised image, a loss may be determined, at operation 512, between the received image and the expected original image without noise or perturbation. The loss is an indication of the difference between the original image and that received. Thus, loss is to be minimized using at least optimization such that the loss is less than determined by a threshold or is zero indicating a match between the two images. The optimization may thus require several iterations until the model converges and/or the loss obtained meets a threshold criteria. As such, at operation 514, if the loss is not less than the threshold value identified, process 500 continues to operation 504 wherein the received image is again filtered by the denoiser module and processed by the adversarially trained model. In one embodiment, such iteration may not occur and instead a prediction is possible and loss is simply recorded and used in later image processing. Alternatively, if the loss meets the threshold criteria, then a prediction is made at operation 516.

Note that as indicated, iterating through the process with the image may or may not occur and instead loss metrics (or any other metrics) may be recorded, and/or feedback to the system for use in future adversarial attack detection processing. In addition, note that these operations are presented as exemplary processed and more or less operations may be involved in the process. In addition, the order of the operations and iteration of the features may occur during other operations and in some instances in parallel while the current process is taking place.

Turning next to FIG. 6, an exemplary architecture is presented for building adversarial attack resistant model. The architecture 600 as presented at FIG. 6 is design to provide an example of the processing and modules involved when received an image that may have been susceptible to an adversarial attack. As illustrated in FIG. 6, the received image (adversarial image 604) may be received from a personal device 602A, user device 602B, automobile 602C, or other smart device capable of receiving, scanning, or detecting images.

The personal device 602A may be a tablet, iPad, desktop or the like. For exemplary purposes, the personal device 602A can be a laptop. The personal device 602A may be used for web browsing, video streaming, bill payments, and online purchases. Additionally, the personal device 602A may be equipped with applications that enable the user to take pictures, read codes, make purchases and transfers using payment provider applications and/or a digital wallet. Further, the personal device 602A may be capable of making phone calls and communicating with one or more other communications devices using a cellular network, Wi-Fi, Bluetooth, BLE, NFC, WLAN, etc. The communication can enable the transmission of information from the personal device 602A to another system or device. In addition, the communication can enable the transmission of photographs, pictures, video, biometrics, and the like for user authentication. For example, the personal device 602A can be used to communicate with an adversarial resistant system 620. In the communication, the personal device 602A may receive, scan, sense, retrieve, etc. an image that may have been perturbed and may have resulted in an adversarial image 604. For example, the personal device 602A may have accessed an image said to provide the user with a product or service.

The user device 604A may be an iPad, Chromebook, smart phone or other portable user device. For exemplary purposes, the user device 602A can be a cellphone. Much like the personal device 602A, the user device 604A may also be used for web browsing, video streaming, bill payments, and online purchases. Additionally, the user device 602B may be equipped with applications that enable the user to take pictures, read codes, make purchases and transfers using payment provider applications and/or a digital wallet. Further, the user device 602B may be capable of making phone calls and communicating with one or more other communications devices using a cellular network, Wi-Fi, Bluetooth, BLE, NFC, WLAN, etc. The communication can enable the transmission of information from the user device 602B to another system or device. In addition, the communication can enable the transmission of photographs, pictures, video, biometrics, and the like for user authentication. For example, the user device 602B can be used to communicate with an adversarial resistant system 620. In the communication, the user device 602B may receive, scan, sense, retrieve, etc. an image that may have been perturbed and may have resulted in an adversarial image 604. For example, the user device 602B may be used to take a photograph of a user or object for use in facial recognition.

The automobile 602C much like the personal device 602 and user device 602B, has similar capabilities as described above and incorporated in its entirety. The automobile 602C may also be able to transport a user from one location to another, navigate autonomously or at least partially autonomously. In addition, the automobile 602C, may be equipped with a plurality of sensors use to detect, scan and collect information about a surrounding. For example, the automobile 602C may be used for reading an image on a sign for processing, interpreting, and perfuming an action as may be indicated by the sign. The sign may also include at least an image which may be injected with noise in order to provide an unanticipated result. The image may then be considered an adversarial image To counteract a possible adversarial attack, the adversarial image 604 may be processed by adversarial resistant system 620. The adversarial resistant system 620 may reside within the one or more devices 602 or exist remotely accessible and used at the receipt of the adversarial image 604. For example, the adversarial image 604 may be received by a third-party service provider capable of detecting an adversarial attack. The adversarial resistant architecture 620 may include one or more modules used for performing the operations described above and in conjunction with FIG. 5.

In one embodiment, the adversarial resistant system 620 includes a denoising autoencoder module 606. As indicated above, the denoising autoencoder module 606 can include a denoiser used to reconstruct the original image by filtering out the noise that was used to modify the image. For example, the denoiser may include an encoder and decoder used for feature determination and dimensionality reduction.

In another embodiment, the adversarial resistant system 620 may also include an adversarially trained model component 610. The adversarially trained model component 610 may be used to host the trained adversarial model which is used to make a prediction regarding the received adversarial image 604. Again, the adversarial trained model may be trained using images that are modified or perturbed by a noise. The images used in training may be stored and retrieved from an image database 612 and noise may be added as used in training. In some embodiments, the adversarial images which have already been modified may also exist and be stored in the image database 612. As the model is trained and being used for processing, a loss measurement may be obtained. The measure may be collected and determined within the adversarially trained model component 610 or may be determined and collected independently by a loss detection module 608. The loss computed, may be used as measure of the difference between the original image and the modified image. As such, the lesser the loss the more similar the images are. As such output from the adversarially trained model, a prediction 614 may be obtained regarding what the original image was and/or the action the system or device 602 should take in response to the image observed. Thus, as a determination is made from the model in conjunction with the losses determined, a prediction may be made and action obtained which can be set back to the device 602 or other entity (e.g., financial institution if face authenticated for purchase, or other entity allowing access on authentication).

Figure 7:
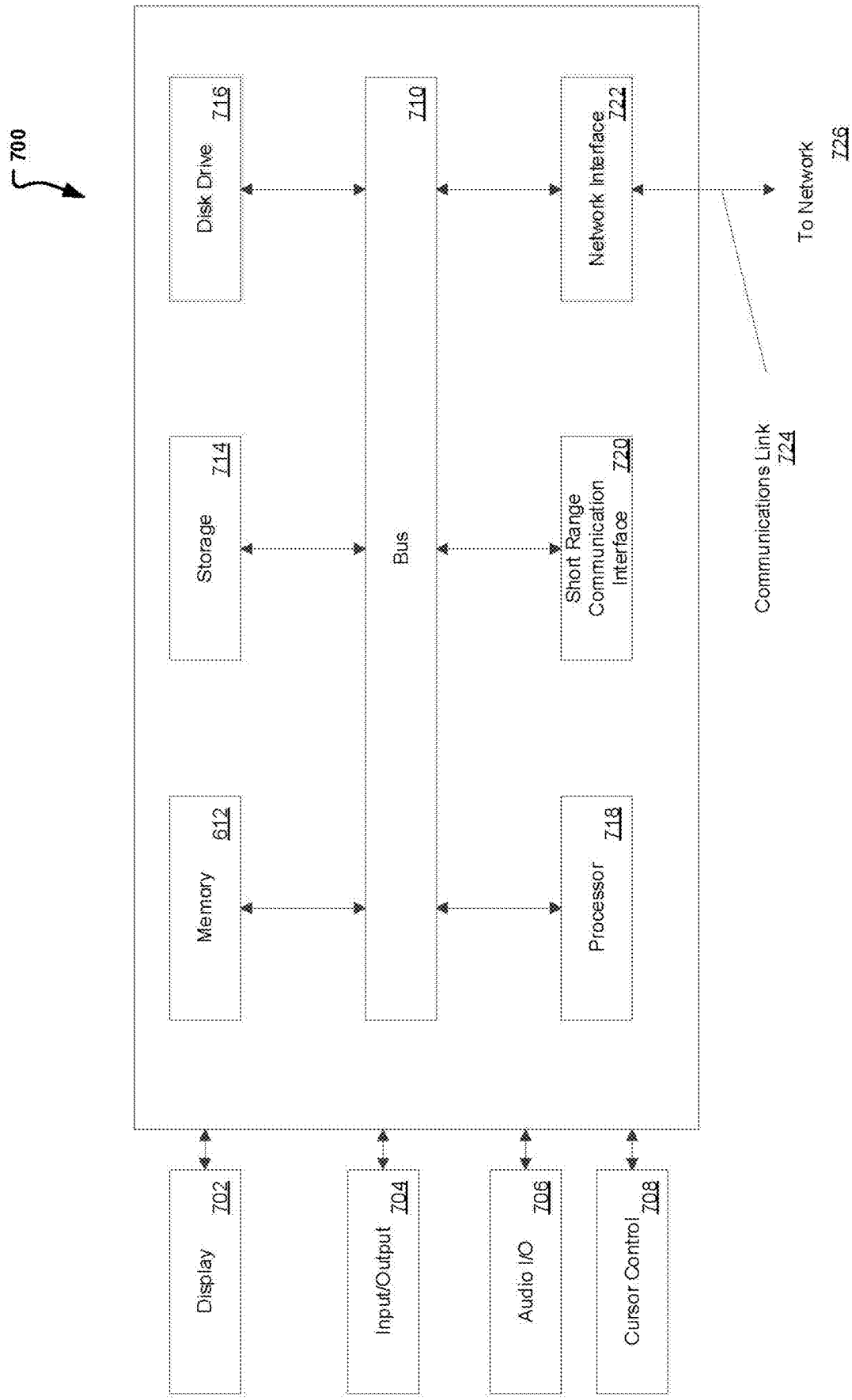
FIG. 7 illustrates an example block diagram of a computer system suitable for implementing one or more devices of the communication systems of FIGS. 1-6.

Turning next to FIG. 7, an exemplary computer system is illustrated which may be used by the device 602. In particular, FIG. 7 illustrates an example computer system 700 in block diagram format suitable for implementing on one or more devices of the system in FIGS. 1-6 and in particular resistant system 600. In various implementations, a device that includes computer system 700 may comprise a personal computing device (e.g., a smart or mobile device, a computing tablet, a personal computer, laptop, wearable device, PDA, vehicle, mirror, or other IoT device, etc.) that can communicate with a network 726. A service provider and/or a content provider may utilize a network computing device (e.g., a network server) capable of communicating with the network. It should be appreciated that each of the devices utilized by users, service providers, and content providers may be implemented as computer system 700 in a manner as follows.

Additionally, as more and more devices become communication capable, such as new smart devices using wireless communication to report, track, message, relay information and so forth, these devices may be part of computer system 700. For example, windows, walls, and other objects may double as touch screen devices for users to interact with. Such devices may be incorporated with the systems discussed herein.

Computer system 700 may include a bus 710 or other communication mechanisms for communicating information data, signals, and information between various components of computer system 700. Components include an input/output (I/O) component 704 that processes a user action, such as selecting keys from a keypad/keyboard, selecting one or more buttons, links, actuatable elements, etc., and sending a corresponding signal to bus 710. I/O component 704 may also include an output component, such as a display 702 and a cursor control 708 (such as a keyboard, keypad, mouse, touchscreen, etc.). In some examples, I/O component 704 other devices, such as another user device, a merchant server, an email server, application service provider, web server, a payment provider server, and/or other servers via a network. In various embodiments, such as for many cellular telephone and other mobile device embodiments, this transmission may be wireless, although other transmission mediums and methods may also be suitable. A processor 718, which may be a micro-controller, digital signal processor (DSP), or other processing component, that processes these various signals, such as for display on computer system 700 or transmission to other devices over a network 726 via a communication link 724. Again, communication link 724 may be a wireless communication in some embodiments. Processor 718 may also control transmission of information, such as cookies, IP addresses, images, and/or the like to other devices.

Components of computer system 700 also include a system memory component 714 (e.g., RAM), a static storage component 714 (e.g., ROM), and/or a disk drive 716. Computer system 700 performs specific operations by processor 718 and other components by executing one or more sequences of instructions contained in system memory component 712 (e.g., for engagement level determination). Logic may be encoded in a computer readable medium, which may refer to any medium that participates in providing instructions to processor 718 for execution. Such a medium may take many forms, including but not limited to, non-volatile media, volatile media, and/or transmission media. In various implementations, non-volatile media includes optical or magnetic disks, volatile media includes dynamic memory such as system memory component 712, and transmission media includes coaxial cables, copper wire, and fiber optics, including wires that comprise bus 710. In one embodiment, the logic is encoded in a non-transitory machine-readable medium. In one example, transmission media may take the form of acoustic or light waves, such as those generated during radio wave, optical, and infrared data communications.

Some common forms of computer readable media include, for example, hard disk, magnetic tape, any other magnetic medium, CD-ROM, any other optical medium, RAM, PROM, EPROM, FLASH-EPROM, any other memory chip or cartridge, or any other medium from which a computer is adapted to read.

Components of computer system 700 may also include a short-range communications interface 720. Short range communications interface 720, in various embodiments, may include transceiver circuitry, an antenna, and/or waveguide. Short range communications interface 720 may use one or more short-range wireless communication technologies, protocols, and/or standards (e.g., WiFi, Bluetooth®, Bluetooth Low Energy (BLE), infrared, NFC, etc.).

Short range communications interface 720, in various embodiments, may be configured to detect other devices (e.g., device 102.) with short range communications technology near computer system 700. Short range communications interface 720 may create a communication area for detecting other devices with short range communication capabilities. When other devices with short range communications capabilities are placed in the communication area of short-range communications interface 720, short range communications interface 720 may detect the other devices and exchange data with the other devices. Short range communications interface 720 may receive identifier data packets from the other devices when in sufficiently close proximity. The identifier data packets may include one or more identifiers, which may be operating system registry entries, cookies associated with an application, identifiers associated with hardware of the other device, and/or various other appropriate identifiers.

In some embodiments, short range communications interface 720 may identify a local area network using a short-range communications protocol, such as WiFi, and join the local area network. In some examples, computer system 700 may discover and/or communicate with other devices that are a part of the local area network using short range communications interface 720. In some embodiments, short range communications interface 720 may further exchange data and information with the other devices that are communicatively coupled with short range communications interface 720.

In various embodiments of the present disclosure, execution of instruction sequences to practice the present disclosure may be performed by computer system 700. In various other embodiments of the present disclosure, a plurality of computer systems 700 coupled by communication link 724 to the network (e.g., such as a LAN, WLAN, PTSN, and/or various other wired or wireless networks, including telecommunications, mobile, and cellular phone networks) may perform instruction sequences to practice the present disclosure in coordination with one another. Modules described herein may be embodied in one or more computer readable media or be in communication with one or more processors to execute or process the techniques and algorithms described herein.

A computer system may transmit and receive messages, data, information and instructions, including one or more programs (i.e., application code) through a communication link 724 and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable media. It is also contemplated that software identified herein may be implemented using one or more computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on the user and user device, however, a customer, a merchant, a service or payment provider may otherwise presented with tailored information. Thus, "user" as used herein can also include charities, individuals, and any other entity or person receiving information. Having thus described embodiments of the present disclosure, persons of ordinary skill in the art will recognize that changes may be made in form and detail without departing from the scope of the present disclosure. Thus, the present disclosure is limited only by the claims.

What is claimed is:
1. A system comprising:
a non-transitory memory storing instructions; and
a processor configured to execute the instructions to cause the system to perform operations comprising:
  receiving, via a wireless network communication, a request for an adversarial attack detection, the request including a modified image;

identifying, by a machine learning model from within the modified image, whether there is a perturbation from the modified image, wherein the identifying comprises:
  generating, by an autoencoder, a denoised image,
  processing, by the machine learning model, the denoised image to determine a reconstruction loss associated with the request for the adversarial attack detection, and
  determining, by the machine learning model, whether a measurement of the reconstruction loss meets threshold criteria indicating an adversarial attack from the perturbation in the modified image;
  determining a prediction of an original image of the modified image, the prediction determined based in part on the reconstruction loss and the measurement of the reconstruction loss determined by the machine learning model, and the prediction including a predicted action based in part on the modified image and the original image; and
  executing the predicted action for the original image.

2. The system of claim 1, wherein the operations further comprise:
  feeding back the reconstruction loss determined by the machine learning model to the autoencoder.

3. The system of claim 1, wherein the modified image includes the original image having the perturbation added to the original image that causes the adversarial attack when a machine processes the modified image, and wherein the adversarial attack causes the machine to produce an erroneous action.

4. The system of claim 1, wherein the machine learning model is an adversarial trained deep learning model.

5. The system of claim 4, wherein the adversarial trained deep learning model is trained using adversarially attacked images.

6. The system of claim 1, wherein a determination that the measurement of reconstruction loss does not meet the threshold criteria indicates the modified image is the original image.

7. The system of claim 1, wherein generating the denoised image includes reconstructing the original image using an encoder and a decoder.

8. A method comprising:
  receiving a request to determine an action on a received image;
  determining the received image is adversarially attacked, the determining including:
    determining by a denoiser processing the received image, a perturbation in the received image that is adversarially attacked, wherein the determining the perturbation comprises determining, by a machine learning model trained using adversarially attacked images, loss level information associated with the received image from the perturbation in the received image, wherein the loss level information indicates that the received image is adversarially attacked using the perturbation based on a loss threshold
  processing, by the machine learning model, the received image and the loss level information associated with the perturbation from the received image;
  making a prediction of an original image from the received image, the prediction determined based on the processing, and the prediction including a predicted action based in part on the received image and the original image; and
  executing the predicted action for the original image.

9. The method of claim 8, wherein the determining that the received image received is adversarially attacked indicates the original image is modified by noise associated with the perturbation.

10. The method of claim 8, wherein the prediction includes a result with a greater confidence than a previous confidence identifying whether the received image is adversarially attacked.

11. The method of claim 8, further comprising determining, by the denoiser, a code of the received image.

12. The method of claim 11, wherein the determining the code includes determining a node reduction of a network by an encoder.

13. The method of claim 11, wherein the denoiser includes a decoder for reconstructing the original image from the code determined.

14. The method of claim 8, wherein the prediction is based in part on a loss detected.

15. A non-transitory machine-readable medium having stored thereon machine-readable instructions executable to cause a machine to perform operations comprising:
  receiving, via a wireless network communication, a request for an adversarial attack detection, the request including a modified image;
  identifying, by a machine learning model from within the modified image, whether there is a perturbation from the modified image, wherein the identifying comprises:
    generating, by an autoencoder, a denoised image,
    processing by the machine learning model, the denoised image to determine a loss associated with the request for the adversarial attack detection, and
    determining, by the machine learning model, whether a loss level of a reconstruction loss meets a threshold criteria indicating an adversarial attack from the perturbation in the modified image;
  determining a prediction based in part on the reconstruction loss and the loss level determined by the machine learning model, wherein the determining the prediction comprises:
    executing a feedback loop that removes the perturbation from the modified image using an iterative processing of the modified image and an original image,
    predicting, using the machine learning model and the executed feedback loop, the original image of the modified image, and
    determining, based on the original image, a predicted action for the original image; and
  executing the predicted action for the original image.

16. The non-transitory machine-readable medium of claim 15, wherein the operations further comprise:
  feeding back the reconstruction loss determined by the machine learning model to the autoencoder.

17. The non-transitory machine-readable medium of claim 15, wherein the modified image includes the original image with the perturbation in a portion of the original image, and wherein the perturbation comprises a machine-readable code that is added to the portion of the original image so that the perturbation is not visible to a human eye.

18. The non-transitory machine-readable medium of claim 15, wherein the machine learning model is an adversarial trained deep learning model.

19. The non-transitory machine-readable medium of claim 18, wherein the adversarial trained deep learning model is trained using adversarially attacked images.

20. The non-transitory machine-readable medium of claim 15, wherein a determination that the loss level does not meet the threshold criteria indicates the modified image is the original image.

* * * * *